United States Patent
Choi et al.

(10) Patent No.: US 11,647,468 B2
(45) Date of Patent: May 9, 2023

(54) TRANSMISSION POWER ALLOCATION METHOD BASED ON USER CLUSTERING AND REINFORCEMENT LEARNING

(71) Applicant: Industry-Academic Cooperation Foundation, Chosun University, Gwangju (KR)

(72) Inventors: Wooyeol Choi, Gwangju (KR); Sifat Rezwan, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 72 days.

(21) Appl. No.: 17/523,493

(22) Filed: Nov. 10, 2021

(65) Prior Publication Data

US 2022/0159586 A1 May 19, 2022

(30) Foreign Application Priority Data

Nov. 17, 2020 (KR) .................. 10-2020-0153564

(51) Int. Cl.
*H04W 52/36* (2009.01)
*H04W 52/26* (2009.01)
(Continued)

(52) U.S. Cl.
CPC ......... *H04W 52/362* (2013.01); *H04L 5/0005* (2013.01); *H04W 52/265* (2013.01); *H04W 72/0473* (2013.01)

(58) Field of Classification Search
CPC ............. H04W 52/362; H04W 52/265; H04W 72/0473; H04W 52/143; H04W 52/283;
(Continued)

(56) References Cited

U.S. PATENT DOCUMENTS

2002/0102983 A1* 8/2002 Furuskar ............. H04W 52/265
455/452.2
2009/0047987 A1* 2/2009 Li ...................... H04W 52/267
455/522
(Continued)

FOREIGN PATENT DOCUMENTS

CN    111901862 A   * 11/2020  ............ H04W 52/34
GB    2235853 A     *  3/1991  ............ H04W 52/04
WO    WO-2022021520 A1 *  2/2022  ........ H04W 72/0473

OTHER PUBLICATIONS

Sifat Rezwan et al., "Efficient User Clustering and Reinforcement Learning Based Power Allocation for NOMA Systems", 2020 International Conference on Information and Communication Technology Convergence (ICTC), Oct. 21-23, 2020, pp. 143-147, doi:10.1109/ICTC49870.2020.9289376.

*Primary Examiner* — Lana N Le
(74) *Attorney, Agent, or Firm* — Studebaker & Brackett PC

(57) ABSTRACT

Provided is a transmission power allocation method based on reinforcement learning with an efficient user clustering method. According to an embodiment of the present disclosure, a transmission power allocation method based on user clustering and reinforcement learning of a base station in a non-orthogonal multiple access (NOMA) system includes a sorting step of sorting channel gains of user equipments located in a coverage of the base station in a size order, a clustering step of allocating the user equipment to each cluster based on the size order, and a power allocation step of allocating power to each user equipment included in the cluster by using a quality function based on a state and an action.

10 Claims, 8 Drawing Sheets

(51) Int. Cl.
*H04L 5/00* (2006.01)
*H04W 72/044* (2023.01)

(58) Field of Classification Search
CPC . H04W 52/267; H04W 72/54; H04W 72/563; H04W 52/346; H04W 52/146; H04W 72/04; H04W 52/30; H04W 72/53; H04L 5/0005; H04L 5/0026; H04L 5/0094; H04L 25/0254; H04L 25/03165; H04L 41/16; H04L 5/0032; H04L 1/16; G06N 20/00; G06N 3/0464; G06N 3/08; G06N 3/09; G06N 3/02; H04J 99/00; H04B 17/373; H04B 17/3913; H04B 1/1027; H04B 17/327
See application file for complete search history.

(56) References Cited

U.S. PATENT DOCUMENTS

| | | | |
|---|---|---|---|
| 2019/0116560 A1* | 4/2019 | Naderializadeh ... | H04W 52/346 |
| 2021/0326695 A1* | 10/2021 | Vitebsky ................ | G06N 3/044 |
| 2021/0334253 A1* | 10/2021 | Darji ...................... | G06F 3/0604 |
| 2022/0187847 A1* | 6/2022 | Cella ...................... | G06N 20/00 |
| 2023/0041216 A1* | 2/2023 | Lu ......................... | H04B 7/0426 |

* cited by examiner

FIG. 3

---
Algorithm 1 User clustering for NOMA system
---
1: User sorting: $h_1 < h_2 < h_3 < \ldots < h_M$
2: Number of Cluster: $k = \text{ceil}(M/m)$
3: User Grouping:
   $n^{th}$ cluster $= h_n, h_{n+k}, h_{n+2*k}, \ldots, h_{n+(z-1)*k}$
   Here $z$ is the position of the user in a cluster
   (i.e. $z^{th}$ user= $1^{st}, 2^{nd}, 3^{rd}$ user and so on.)
4: Cluster Size:
   if $(M \bmod k) == 0$ then
      All cluster will have $m$-user
   else Different users per cluster
   end if
---

FIG. 5

| Algorithm 2 Q-learning based NOMA power allocation |
|---|
| 1: $Q(S_t, \theta) = 0$ |
|     // Hot-booting Starts |
| 2: for $i = 1, 2, \ldots, E$ do |
| 3:     Emulate radio environment |
| 4:     for $t = 1, 2, \ldots, T$ do |
| 5:         Choose action $\theta$ at random for all users |
| 6:         Obtain data rate $R_i$ for each user via (1) |
| 7:         $S_{t+1}$ = User index with the minimum data rate |
| 8:         if $\min(R_i) > R_0$ then |
| 9:             $r = R_s$ |
| 10:         else |
| 11:             $r = 0$ |
| 12:         end if |
| 13:         Update $Q(S_t, \theta)$ via Markov decision process (6) |
| 14:     end for |
| 15: end for |
|     // Hot-booting Ends |
| 16: for $t = 1, 2, \ldots, T$ do |
| 17:     for $c = 1, 2, \ldots, k$ do |
| 18:         Choose users for cluster via Algorithm 1 |
| 19:         for $m = 1, 2, \ldots, M/k$ do |
| 20:             Choose action $\theta$ via (5) |
| 21:             Allocate power $\theta_m P_t$ for signal to user $m$ |
| 22:             Obtain data rate $R_i$ for each user via (1) |
| 23:         end for |
| 24:         $S_{t+1}$ = User index with the minimum data rate |
| 25:         if $\min(R_i) > R_0$ then |
| 26:             $r = R_s$ |
| 27:         else |
| 28:             $r = 0$ |
| 29:         end if |
| 30:         Update $Q(S_t, \theta)$ via Markov decision process (6) |
| 31:     end for |
| 32: end for |

TRANSMISSION POWER ALLOCATION METHOD BASED ON USER CLUSTERING AND REINFORCEMENT LEARNING

CROSS-REFERENCE TO RELATED APPLICATIONS

This application claims the priority of Korean Patent Application No. 10-2020-0153564 filed on Nov. 17, 2020, in the Korean Intellectual Property Office, the disclosure of which is incorporated herein by reference.

BACKGROUND OF THE INVENTION

Field of the Invention

The present disclosure relates to a transmission power allocation method based on user clustering and reinforcement learning of a base station in a non-orthogonal multiple access (NOMA) system, and more particularly, to a transmission power allocation method based on reinforcement learning to which a simple and effective user clustering method is applied.

Description of the Related Art

A 5th generation (5G) network innovates current network architectures to provide three types of major services, called a enhanced mobile broadband (eMBB), massive machine-type communications (mMTC), and ultra-reliable and low latency communications (URLCC). For spatial efficiency and large connection support, non-orthogonal multiple access (NOMA) is more attracting attention than other techniques. The NOMA supports services to multiple users using the same radio resource block (RRB).

In previous generations, orthogonal multiple access (OMA) in which a dedicated RRB is allocated to each user was used. Meanwhile, the NOMA combines message signals of multiple users using each different power and transmits superimposed signals to all users using the same RRB. Each user equipment UE applies successive interference cancellation (SIC) to detect and decode their desired signals from the received signals.

However, there are some practical problems in implementing the NOMA system. In the NOMA system, since a decoder needs to observe a signal to interference plus noise ratio (SINR) in each stage of the SIC, a sophisticated power control policy is required to decode a desired signal. Furthermore, the overall system performance may deteriorate due to amplitude and phase estimation errors known as fractional error factors (FEFs). As a result, an optimal power allocation technique is required to solve these problems.

Another practical performance enhancement technique is user clustering. As the performance improvement technique of the NOMA system, the user clustering and the power allocation technique have been actively studied in a variety of views. In a currently ongoing research, a basic cluster of size 2 is generally assumed, wherein the clustering problem is simplified to a pairing problem. However, an increase in the number of users per cluster increases the system complexity of SIC as well as spatial efficiency. Therefore, the user clustering encompasses an optimal cluster size problem and a UE grouping problem to maximize the overall network performance of the NOMA.

The above-described technical configuration is the background art for helping in the understanding of the present invention, and does not mean a conventional technology widely known in the art to which the present invention pertains.

SUMMARY OF THE INVENTION

An object of the present disclosure provides a power allocation method based on reinforcement learning with an efficient user clustering technique in order to overcome a problem of power allocation in a NOMA system.

The objects of the present disclosure are not limited to the aforementioned objects, and other objects, which are not mentioned above, will be apparent to a person having ordinary skill in the art from the following description.

According to an embodiment of the present disclosure, a transmission power allocation method based on user clustering and reinforcement learning of a base station in a non-orthogonal multiple access (NOMA) system includes a sorting step of sorting channel gains of user equipments located in a coverage of the base station in a size order, a clustering step of allocating the user equipment to each cluster based on the size order, and a power allocation step of allocating power to each user equipment included in the cluster by using a quality function based on a state and an action. Wherein, the state is an index of the user equipment having a minimum data rate in a current time slot, the action corresponds to a power level of the user equipment in the cluster, and the quality function is a function providing a discount expected reward for a combination of each state and the action.

According to the embodiment of the present disclosure, the clustering step may include a step of allocating $n+(z-1)*k$-th user equipment among the user equipments sorted in the size order of the channel gains to an n-th cluster, wherein n represents an index of the cluster, z represents an order of the corresponding user equipment in the n-th cluster, and k represents the number of clusters.

According to the embodiment of the present disclosure, the clustering step may include a step of determining the number of user equipments included in each cluster based on a modular operation of the number of clusters to the number of all user equipments in the coverage.

According to the embodiment of the present disclosure, the power allocation step may further include an initialization step of allocating any action with respect to each user equipment in the coverage before allocating the power to the user equipment.

According to the embodiment of the present disclosure, the power allocation step may include a step of acquiring an optimal action corresponding to the action and state combination providing a maximum discount expected reward in the quality function.

According to the embodiment of the present disclosure, the power allocation step may include a step of allocating a value obtained by multiplying a power budget per cluster in the acquired optimal action.

According to the embodiment of the present disclosure, the power allocation step may further include a data rate acquisition step of acquiring a data rate of each user equipment in the cluster.

According to the embodiment of the present disclosure, the power allocation step may further include a quality function update step of updating the quality function based on the data rate of each user equipment in the cluster.

According to the embodiment of the present disclosure, the quality function update step may include a step of setting a sum data rate of user equipments located in the coverage as a reward when a minimum data rate is larger than a minimum data rate requirement in the cluster, a step of setting 0 as the reward when the minimum data rate is smaller than or equal to the minimum data rate requirement in the cluster, and a step of updating the quality function using the set reward.

According to the present disclosure, it is possible to improve a data transmission throughput in the NOMA system by the power allocation method using user clustering.

The effects of the present disclosure are not limited to those mentioned above, and other effects not mentioned can be clearly understood to those skilled in the art from the following description.

BRIEF DESCRIPTION OF THE DRAWINGS

The above and other aspects, features and other advantages of the present invention will be more clearly understood from the following detailed description taken in conjunction with the accompanying drawings, in which:

FIG. 3 illustrates a process for user clustering in the NOMA system;

FIG. 5 illustrates a power allocation process based on Q-learning in the NOMA system;

DETAILED DESCRIPTION OF THE PREFERRED EMBODIMENT

Figure 1:
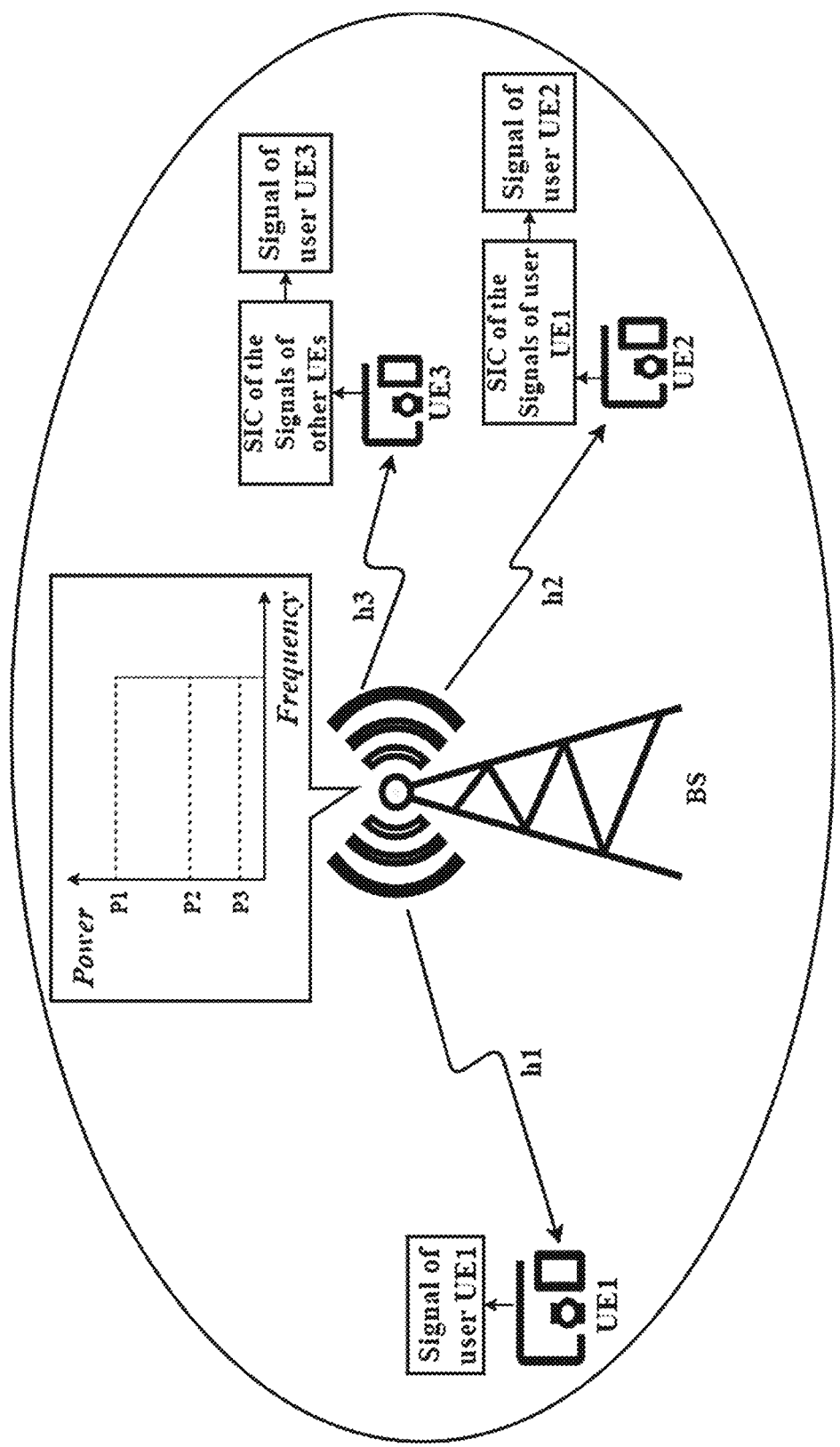
FIG. 1 illustrates a downlink non-orthogonal multiple access (NOMA) system to which successive interference cancellation (SIC) is applied.

Hereinafter, embodiments of the present disclosure will be described in detail with reference to the accompanying drawings so as to easily implement those with ordinary skill in the art to which the present disclosure pertains. The present disclosure may be implemented in various different forms and is not limited to embodiments described herein.

A part irrelevant to the description will be omitted to clearly describe the present disclosure, and like or similar components will be designated by like reference numerals throughout the specification.

In various embodiments, components having the same configuration are described using the same reference numerals only in a representative embodiment, and in other embodiments, only configurations different from the representative embodiment will be described.

Further, throughout the specification, when it is described that a certain part is "connected (or coupled)" with the other part, it means that the certain part may be "directly connected (or coupled)" with the other part and may be "indirectly connected (or coupled)" with another member therebetween. In the present specification, when a certain part "comprises" a certain component, unless explicitly described to the contrary, it will be understood to imply the inclusion of stated elements but not the exclusion of any other elements.

Unless contrarily defined, all terms used herein including technological or scientific terms have the same meanings as those generally understood by those skilled in the art to which the present disclosure pertains. Terms which are defined in a generally used dictionary should be interpreted to have the same meaning as the meaning in the context of the related art, and are not interpreted as an ideal meaning or excessively formal meanings unless otherwise defined in the present application.

Non-Orthogonal Multiple Access (NOMA)

In a NOMA system, a plurality of users may be served at different power levels using a single resource block, and successive interference cancellation (SIC) is performed by a receiver side to decode an allocated user's signal.

It is assumed that the NOMA system is configured by m users with different channel gains. A base station BS with one transmitter transmits a non-orthogonally signal using the same radio resource block (RRB) (that is, frequency, time, and code). The non-orthogonal means that a plurality of signals having different power levels are superimposed to each other to form a single signal. Since the base station BS uses the same RRB, all users receive the same signal and signals of other users become interference. In order to acquire a desired signal, the respective users initially decode the largest interference signal using SIC and removes the largest interference signal from the original signal. After decoding and removing all interference signals, the user acquires a desired signal. In order to perform the SIC process, the intensities of the interference signals need to be much larger than that of the desired signal. Therefore, the selecting of the power level for each user becomes a core of the NOMA system.

The power level for each user depends on a channel gain of the corresponding user. A larger channel gain means that the user is close to the base station BS and low power is required when the signal is transmitted to the corresponding user. A low channel gain implies that the corresponding user is far from the base station BS and high power is required to transmit the signal to the corresponding user. Therefore, the user with the high channel gain may receive large interference due to a high power signal of the user with the low channel gain, and easily suppress all interferences using the SIC. On the other hand, the user with the low channel gain may receive low interference due to a low power signal of the user with the high channel gain, and may not sufficiently suppress the interference.

In FIG. 1, a 3-user downlink NOMA system is illustrated, wherein $h_1 < h_2 < h_3$ represents channel gains of a first user UE1, a second user UE2, and a third user UE3, respectively. In the scenario, the third user UE3 may receive an interference signal from the first user UE1 and the second user UE2 and suppress all interferences using SIC. The second user UE2 may receive an interference signal from the first user UE1 and the third user UE3, but may suppress only the interference from the first user UE1 using the SIC to decode a desired signal. Finally, the first user UE1 treats signals of the third user UE3 and the second user UE2 as noise and decodes a desired signal. Then, a data rate Ri for the 3-user downlink NOMA system may be expressed as Equation 1 below.

$$R_i = \log_2\left(1 + \frac{P_i|h_i|^2}{\sum_{j=i+1}^{3} P_j|h_i|^2 + n_0}\right), i = 1, 2, 3,$$ [Equation 1]

In Equation 1, $P_i$ represents transmission power for a user i, $h_i$ represents a channel gain of the user i, and $n_0$ represents a noise power spectral density.

System Model

It is considered that a macro base station BS serves distributed M user equipments UEs. The base station BS and the user equipments UEs are configured by one antenna, respectively. A total available bandwidth (BW) is divided into a plurality of resource blocks that are orthogonal to each other. The number of users served by each NOMA cluster is represented by m, wherein m has a range of 2<=M<=M. Thus, the total number of clusters is k, wherein k has a range of 1<=K<=M/2. The maximum transmission power per NOMA cluster is $P_t$, and a channel gain for an i-th user is $h_i$, which depends on a distance between the base station BS and the user equipment UE. The users are sorted in a size order (ascending order) of the channel gain, such as $h_1 < h_2 < h_3 < \ldots < h_M$.

In this specification, a sum data rate for verifying the performance of the NOMA system is used. In this system, a sum data rate $R_S$ is defined as Equation 2 below.

$$R_s = \sum_{1}^{k}\sum_{i=1}^{m}\log_2\left(1 + \frac{P_i|h_i|^2}{\sum_{j=i+1}^{3} P_j|h_i|^2 + n_0}\right)$$ [Equation 2]

In Equation 2, $P_i$ represents transmission power for a user i, $h_i$ represents a channel gain of the user i, $n_0$ represents a noise power spectral density, m represents the number of users served by each NOMA cluster, and k represents the total number of clusters.

A total of power allocated to all users of any cluster needs to be smaller than or equal to $P_t$, which is expressed as Equation 3 below.

$$\sum_{i=1}^{m} P_i \le P_t$$ [Equation 3]

In Equation 3, $P_i$ represents transmission power for a user m represents the number of users served by each NOMA cluster, and $P_t$ represents a total of power allocated in a cluster.

The condition of the data rate Ri for ensuring a minimum data rate requirement of the i-th user is expressed as Equation 4 below.

$$\log_2\left(1 + \frac{P_i|h_i|^2}{\sum_{j=i+1}^{3} P_j|h_i|^2 + n_0}\right) > R_i, i = 1, 2, \ldots, m$$ [Equation 4]

In Equation 4, $P_i$ represents transmission power for a user i, $h_i$ represents a channel gain of the user i, $n_0$ represents a noise power spectral density, m represents the number of users served by each NOMA cluster, and k represents the total number of clusters.

One user equipment UE may be served by at most one cluster

Hereinafter, in order to maximize the sum data rate, an efficient and intuitive user clustering method to which the power allocation method based on reinforcement learning is applied will be described.

User Clustering

It is assumed that m users are served from one resource block using a power domain (PD) NOMA method. With respect to the system, an available throughput of each user may be calculated as Equation 1 for i=1, 2, 3, . . . , m. The largest factor that affects the sum data rate of the cluster is a channel gain of the user. The user with the high channel gain will contribute significantly to the increase of the sum data rate, but the sum data rate of the user with the low channel gain mostly depends on the allocated power. Therefore, when the user with the low channel gain is paired with a user with a significantly high channel gain, the sum data rate will be maximized.

Figure 2:
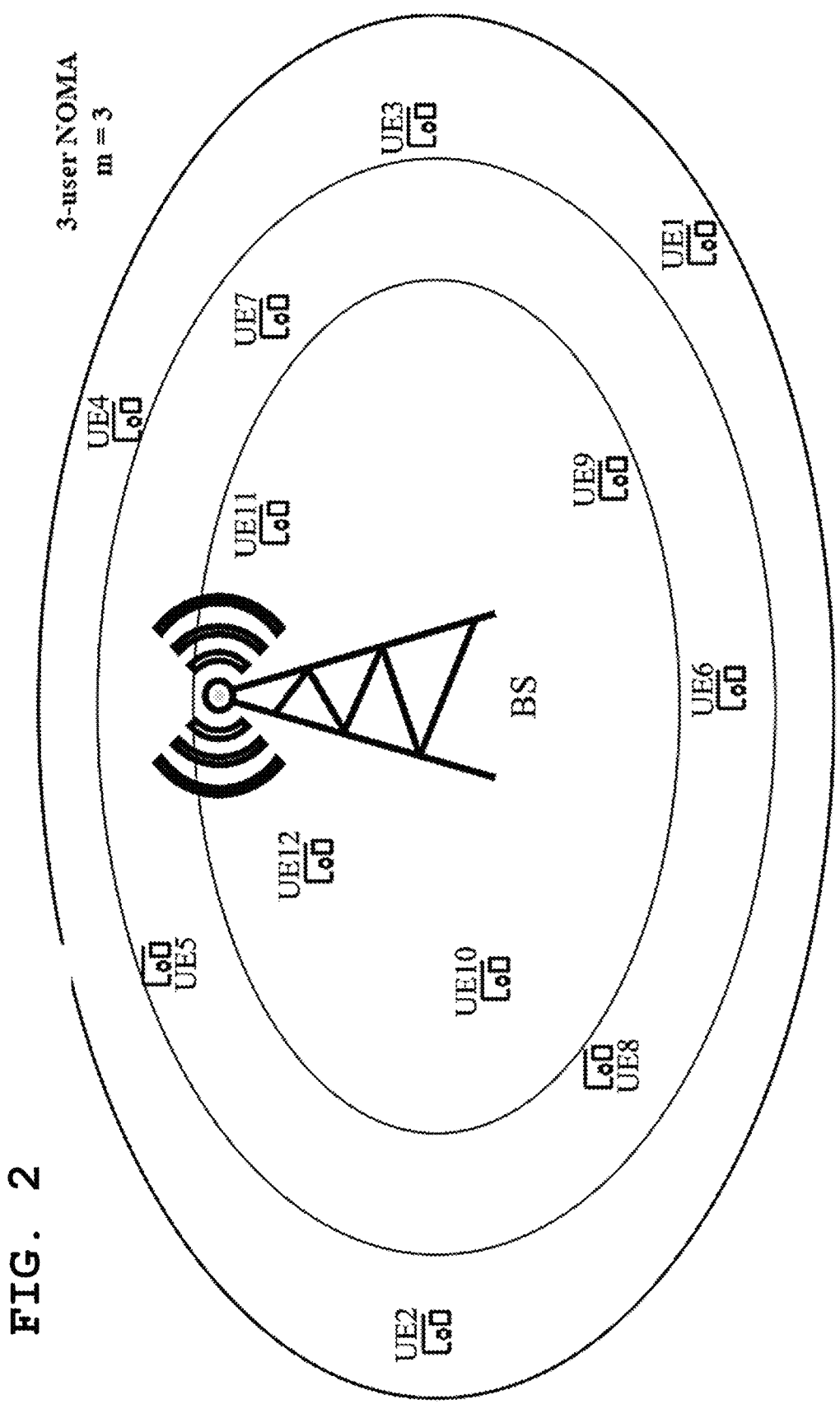
FIG. 2 illustrates an example of a NOMA system to which user clustering is applied.

In order to meet the demand, a coverage area of the base station BS is divided into m circles shown in FIG. 2. For example, in the case of a 3-user NOMA, m is 3. In this scenario, the number M of users is 12 and sorted in ascending order based on channel gains of the users. The first user equipment UE1 has the lowest channel gain h1 and 12-th user equipment UE12 has the highest channel gain h2. A user clustering method according to an embodiment of the present disclosure is illustrated in FIG. 3.

Referring to FIG. 3, first, channel gain values are sorted in size order (ascending order) of a channel gain for each user equipment in step 1. In step 2, the number k of clusters is determined, and the number k of the cluster is determined by k=ceil (M/m). The ceil represents a round-off operation on a decimal point, M represents the number of total user equipments, and m represents the number of user equipments per cluster.

Then, in step 3, the user grouping is performed. For example, the user equipments of an n-th cluster includes user equipments corresponding to $h_n$, $h_{n+k}$, $h_{n+2*k}$, . . . , and $h_{n+(z-1)*k}$. Here, z represents a position (order) of the user equipment in the corresponding cluster.

Then, in step 4, a size of the cluster is determined. As illustrated in FIG. 3, whether a modular operation (M mod k) result of the number k of the clusters to the number M of total users is 0 is confirmed, and if the result is 0, all clusters have the same user number m, but if the result is not 0, each cluster may have a different user number.

Figure 4A:
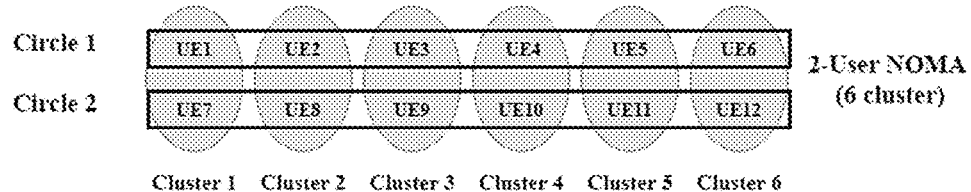
FIGS. 4A-4D illustrate an example of a user clustering method in the NOMA system.
Figure 4B:
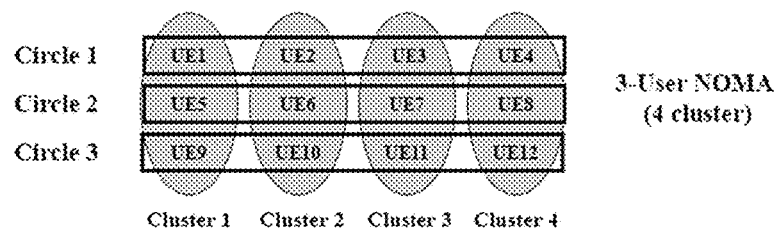
Figure 4C:
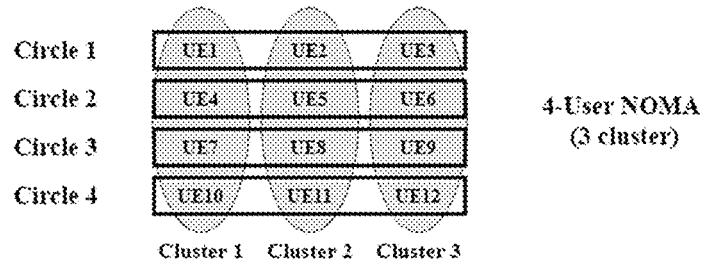
Figure 4D:
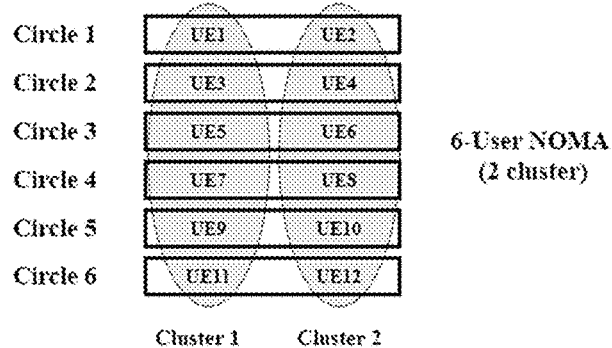

FIGS. 4A-4D illustrate an example of user clustering when a total user number M is 12, wherein one circle represents one cluster. FIG. 4A illustrates two users in one cluster, FIG. 4B illustrates three users in one cluster, FIG. 4C illustrates four users in one cluster, and FIG. 4D illustrates six users in one cluster, respectively.

Power Allocation Using Reinforcement Learning

In various reinforcement learning methods, a Q-learning algorithm may be used to allocate power in the NOMA system. The Q-learning may obtain a suitable strategy with a maximum probability using a Markov decision process. (Reference: E. R. Gomes and R. Kowalczyk, Dynamic analysis of multiagent Qlearning with ε-greedy exploration, in Proceedings ACM Annual International Conference on Machine Learning, Montreal, QC, Canada, June 2009, pp. 369-376). The Q-learning searches for other states that occur every time a different action is taken, and utilizes experiences that provide a maximum sum data rate of the base station BS.

The power allocation method according to the present disclosure depends on a quality function (Q-function), which provides a discount expected reward for each state-action pair. Here, a state $S_t$ represents an index of a user having a minimum data rate in a time slot t, and an action θ is responsible for a power level in the cluster. During a learning process, the exchange between the search and utilization affects the performance of the algorithm.

Thus, the algorithm acquires the action θ using a ε-greedy policy, which is shown as Equation 5.

$$P(\theta) = \begin{cases} 1-\epsilon & \text{if } \theta = \text{argmax} Q(S_t, \theta) \\ \text{random value } (0, 1] & \text{otherwise} \end{cases} \quad \text{[Equation 5]}$$

Initially, any search is made in starting of standard Q-learning due to all null values in a Q-table. Therefore, a hot-booting method is used to acquire pre-training data in a scale. (Reference: L. Xiao, Y. Li, C. Dai, H. Dai and H. Poor, "Reinforcement Learning-Based NOMA Power Allocation in the Presence of Smart Jamming" IEEE Transactions on Vehicular Technology, vol. 67, no. 4, pp. 3377-3389, 2018). After hot-booting, as illustrated in FIG. 5, the proposed Q-learning algorithm initiates utilizing an environment for achieving a maximum throughput-sum.

Referring to FIG. 5, a hot-boot process is first performed. A quality function Q(St, θ) is initialized and a radio environment is emulated by each episode. Also, any action θ is selected for all users for each time slot, and acquires a data rate $R_i$ for each user through Equation 1. A user's index having a minimum data rate is allocated to a subsequent state $S_{t+1}$. In the corresponding episode, whether a minimum value of the sum data rate $R_i$ is larger than a minimum data rate requirement $R_0$ is confirmed, and if the minimum value is larger, a sum data rate $R_S$ is set as a reward r and if not (smaller or equal), 0 is set as the reward r. In addition, the quality function is updated through the Markov decision process, as Equation 6 below. When the above-described process is performed for all episodes and all time slots for each episode, the hot-booting is terminated.

Then, the user is selected through the algorithm of FIG. 3 for each cluster (c=1, 2, . . . , k) for each time slot (t=1, 2, . . . , T). For each user (m=1, 2, . . . , M/k) of each cluster, an optimal action θ is selected through Equation 5, a value $\theta_m P_t$ obtained by multiplying a power budget $P_t$ of the corresponding cluster by an optimal action $\theta_m$ (power level) is allocated as power for a signal of a user m, and a data rate $R_i$ of each user is obtained through Equation 1. Thereafter, the user index with the minimum data rate is allocated to the state $S_{t+1}$ in the corresponding cluster. Whether a minimum value of the sum data rate $R_i$ is larger than a minimum data rate requirement $R_0$ is confirmed, and if the minimum value is larger, a sum data rate $R_S$ is set as a reward r and if not (smaller or equal), 0 is set as the reward r. In addition, the quality function is updated through the Markov decision process, as Equation 6 below. The above-described process is performed for all time slots and all clusters for time slot.

In an algorithm of FIG. 5, E represents the number of episodes, and T represents a time slot. Furthermore, the Markov decision process is used for updating the Q-table, which is the same as Equation 6.

$$Q(S_t,\theta)=(1-\alpha)\times Q(S_t,\theta)+\alpha(r+\delta(\max Q(S_t,\theta))) \quad \text{[Equation 6]}$$

In Equation 6, $\alpha \in (0,1]$ represents a learning rate of an algorithm that reflects a weight of the current experience, r represents a reward obtained for the action, and δ represents a discount factor that is selected according to the uncertainty of a future gain in the range of (0,1].

Figure 8:
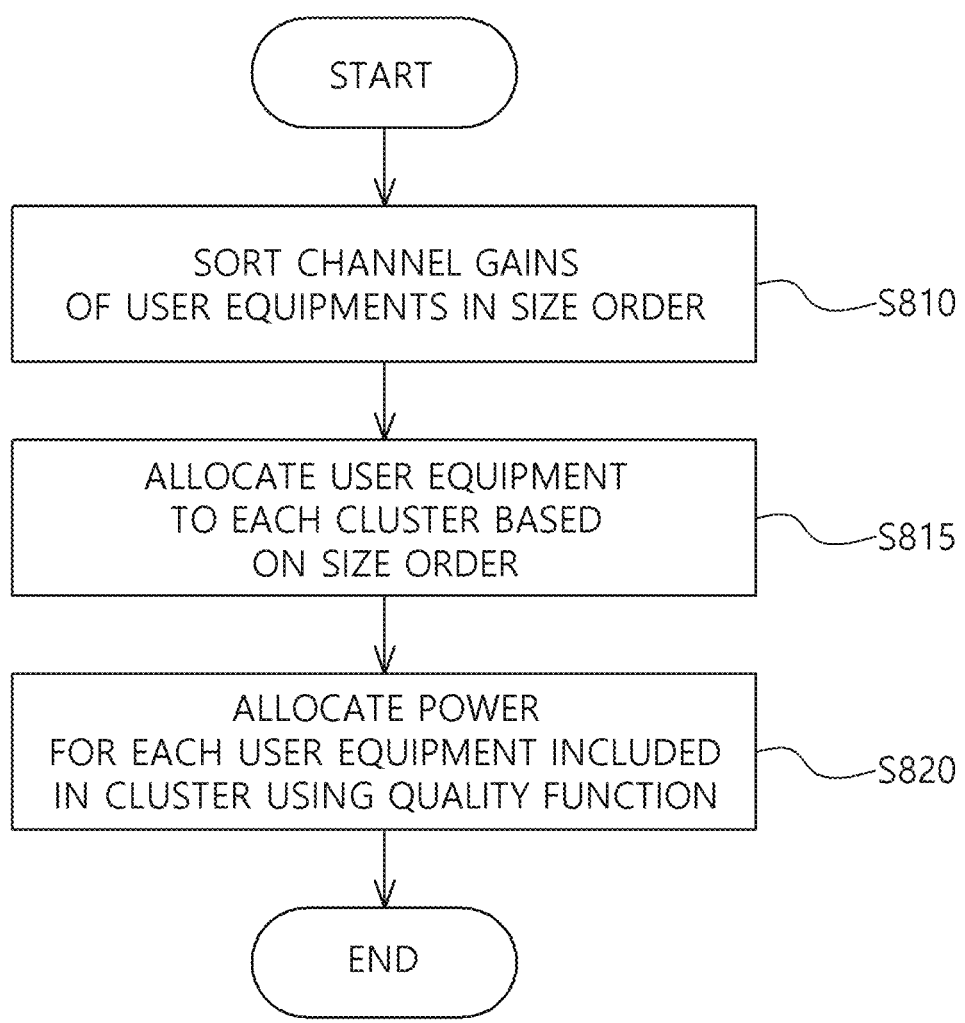
FIG. 8 is a flowchart of a transmission power allocation method based on user clustering and reinforcement learning of a base station in a downlink NOMA system.

The transmission power allocation method based on user clustering and reinforcement learning of the base station in the downlink NOMA system described above may be as illustrated in FIG. 8. Referring to FIG. 8, the transmission power allocation method based on user clustering and reinforcement learning includes an sorting step (S810) of sorting channel gains h of user equipments UE located in a coverage of the base station BS in a size order ($h_1 < h_2 < h_3 < \ldots < h_M$), a clustering step (S815) of allocating the user equipment UE to each cluster based on the size order, and a power allocation step (S820) of allocating power to each user equipment UE included in the cluster by using a quality function $Q(S_t, \theta)$ based on a state $S_t$ and an action θ. Here, the state $S_t$ is an index of the user equipment UE having a minimum data rate in a current time slot, the action θ corresponds to a power level of the corresponding user equipment UE in the cluster, and the quality function $Q(S_t, \theta)$ is a function providing a discount expected reward for a combination of each state and the action.

According to the embodiment of the present disclosure, the clustering step (S815) includes a step of allocating n+(z−1)*k-th user equipment among the user equipments sorted in the size order of the channel gains to an n-th cluster, wherein n represents an index of the cluster, z represents an order of the corresponding user equipment UE in the n-th cluster, and k represents the number of clusters. For example, a user for each cluster may be allocated as shown in step 3 of FIG. 3.

According to the embodiment of the present disclosure, the clustering step (S815) may include a step of determining the number of user equipments included in each cluster based on a modular operation (M mod k) of the number k of clusters to the number M of all user equipments in the coverage. For example, in step 4 of FIG. 3, the size of the cluster (the number of user equipments in the cluster) may be determined.

According the embodiment of the present disclosure, the power allocation step (S820) may further include a step of initializing any action with respect to each user equipment in the coverage before allocating the power to the user equipment UE. For example, in the algorithm of FIG. 5, like the hot-booting process, the process of selection and initializing any action θ to all users may be performed before the power allocation process.

According to the embodiment of the present disclosure, the power allocation step (S820) may include a step of acquiring an optimal action (θ=argmax $Q(S_t, \theta)$) corresponding to the action and state combination providing the maximum discount expected reward in the quality function $Q(S_t, \theta)$. Further, the power allocation step (S820) may include a step of allocating a value $\theta_m P_t$ obtained by multiplying a power budget $P_t$ per cluster in the acquired optimal action $\theta_m$.

According to the embodiment of the present disclosure, the power allocation step (S820) may further include a data rate acquisition step of acquiring a data rate $R_i$ of each user equipment UE in the cluster. For example, a process corresponding to a 22-th line of FIG. 5 may be performed.

According to the embodiment of the present disclosure, the power allocation step (S820) may further include a quality function update step of updating the quality function $Q(S_t, \theta)$ based on the data rate of each user equipment UE in the cluster.

According to the embodiment of the present disclosure, the quality function update step may include a step of setting a sum data rate $R_S$ of user equipments located in the coverage as a reward r when a minimum data rate min($R_i$) is larger than a minimum data rate requirement $R_0$ (min($R_i$)>$R_0$) in the cluster, a step of setting 0 as the reward r when the minimum data rate min($R_i$) is smaller than or equal to the minimum data rate requirement $R_0$ (min($R_i$)<=$R_0$) in the cluster, and a step of updating the quality function $Q(S_t, \theta)$ using the set reward. In the updating of the quality function $Q(S_t, \theta)$, Equation 6 may be used.

The NOMA system according to the embodiment of the present disclosure may include the base station BS performing the transmission power allocation method based on user clustering and reinforcement learning described above and user equipments UEs served by the base station BS.

Evaluation of Performance

The performances of NOMA systems to which a user clustering algorithm is applied according to a Q-learning based power allocation algorithm, only the Q-learning based power allocation algorithm, and user clustering with uniform power allocation were compared with each other. In order to evaluate the performance, parameters given in Table 1 below are used.

TABLE 1

| Parameter | Value |
| --- | --- |
| Bandwidth of a resource block, BW | 1 MHz |
| Power Budget, $P_t$ | 20 W |
| Number of users, M | 12 |
| Number of users per cluster, m | 2, 3, 4, 6 |
| Number of antennas at BS and UE | 1 |
| Learning rate, α | 0.2 |
| Discount rate, δ | 0.7 |
| Exploration rate, ε | 1 |
| Number of episodes, E | 200 |
| Minimum data rate requirement, $R_0$ | 1 bps/Hz |

Initially, a distance between the base station BS and the users is optionally selected within the coverage of the base station BS. Thereafter, a channel gain $h_i$ is calculated using a Rayleigh fading model, wherein a path loss index η is 4 (η=4).

Figure 6:
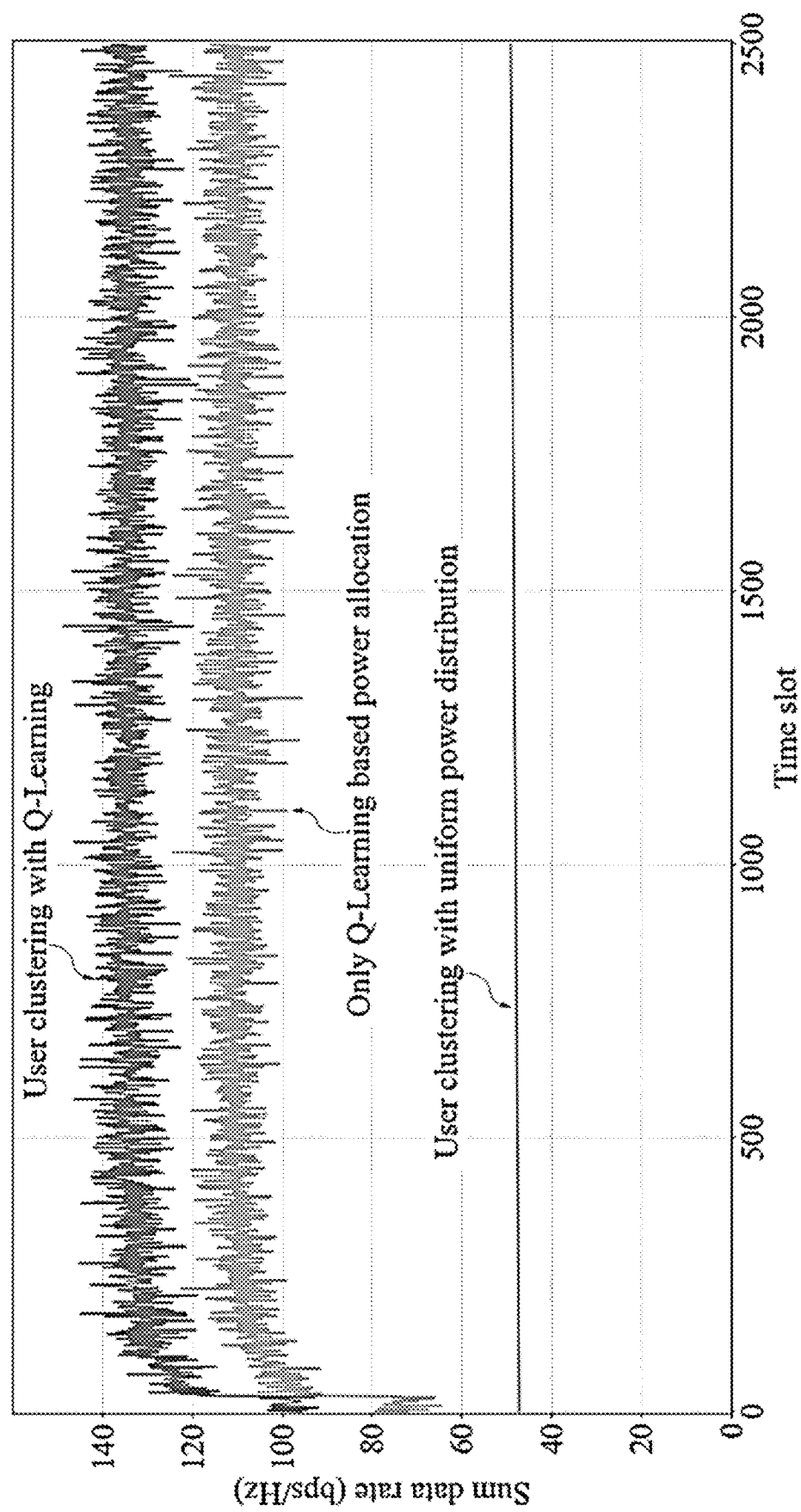
FIG. 6 illustrates a simulation result for a sum data rate in a 2-user NOMA system.

FIG. 6 illustrates a sum data rate of a 2-user PD-NOMA system in the three different scenarios described above. In FIGS. 4A-4D, it can be confirmed that these methods according to the present disclosure achieves optimal performance and stability in all scenarios.

Figure 7:
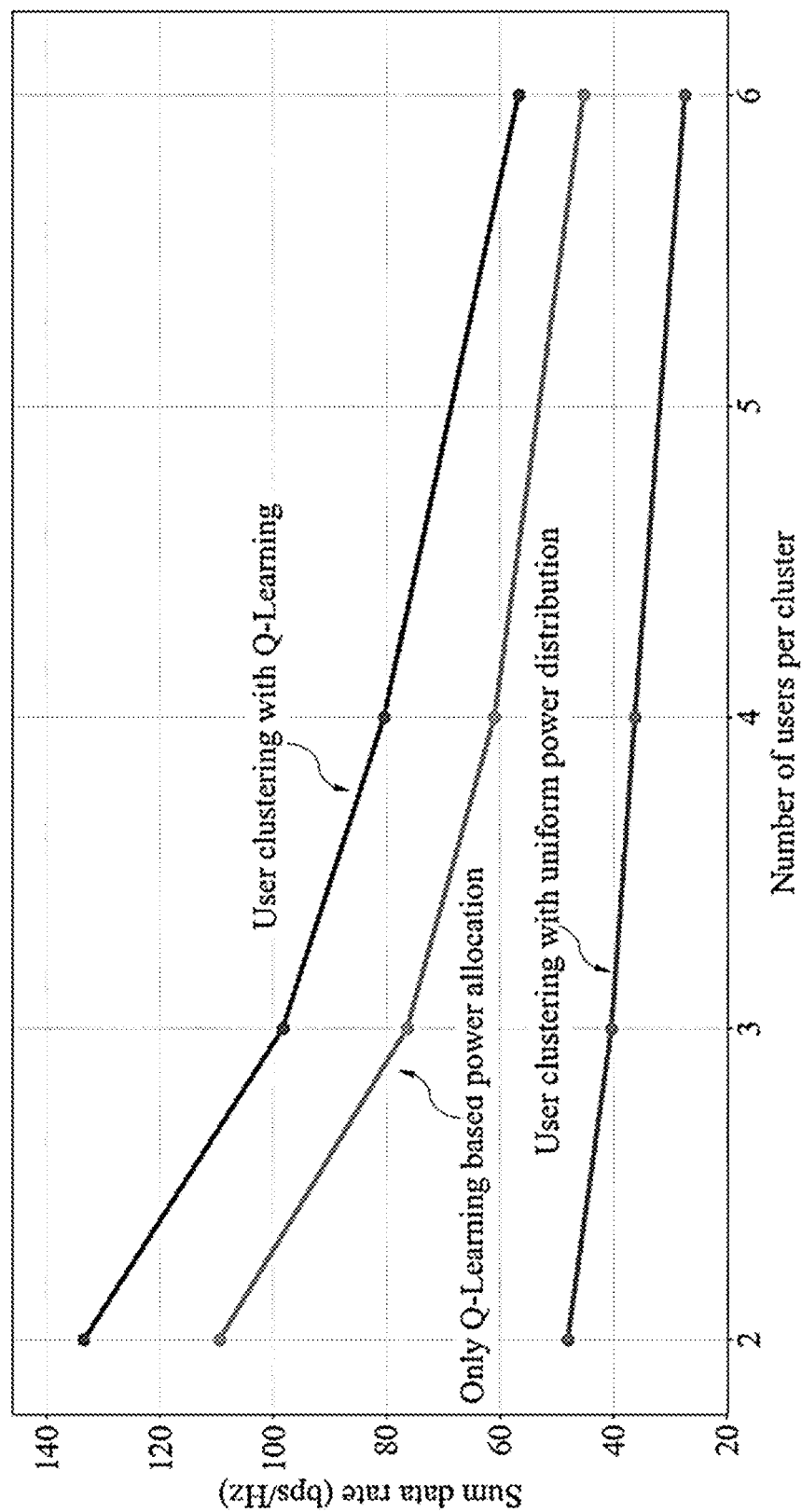
FIG. 7 illustrates a simulation result for sum data rates in 2, 3, 4, and 6-user NOMA systems.

FIG. 7 illustrates a simulation result for sum data rates in 2, 3, 4, and 6-user NOMA systems. Referring to FIG. 7, it is obvious that the sum data rate of the NOMA system according to the present disclosure represents the optimal performance in all user NOMA systems. Furthermore, from the graph of FIG. 7, it can be confirmed that as the number of users per cluster increases, the system becomes more complicated, and as the users increase, the total power budget is divided so that the entire data rate decreases. Although the overall throughput decreases as the number of users per cluster increases, it is confirmed that the throughput that may be achieved by the NOMA system according to the present disclosure has optimal performance in all scenarios.

As described above, the Q-learning based power allocation algorithm to which a simple and efficient user clustering method was applied in the NOMA system was introduced and analyzed. In addition, like a NOMA system to which only the Q-learning based power allocation algorithm is applied and a NOMA system to which only user clustering with uniform power distribution is applied, other scenarios have been reviewed together. It was confirmed that the power allocation algorithm to which the user clustering is applied derives optimal performance as compared to other scenarios. Furthermore, a plurality of NOMA constraints, such as a transmission power budget and a user's data rate minimal requirement, are incorporated into the Q-learning algorithm to be overcome. The proposed user clustering method supports the downlink and uplink NOMA systems to achieve a maximum throughput.

The drawings accompanied in the embodiment and the specification just clearly represent part of the technical idea included in the present disclosure, and it will be apparent that modifications and specific embodiments that can be easily derived by those skilled in the art within the scope of the technical idea contained in the specification and drawings of the present disclosure are all included in the scope of the present disclosure.

Therefore, the spirit of the present disclosure should not be defined only by the described exemplary embodiments, and it should be appreciated that claims to be described below and all which are equivalent to the claims or equivalently modified to the claims are included in the scope of the spirit of the present disclosure.

What is claimed is:

1. A transmission power allocation method based on user clustering and reinforcement learning of a base station in a non-orthogonal multiple access (NOMA) system, comprising:
   a sorting step of sorting channel gains of user equipments located in a coverage of the base station in a size order;
   a clustering step of allocating the user equipment to each cluster based on the size order; and
   a power allocation step of allocating power to each user equipment included in the cluster by using a quality function based on a state and an action,
   wherein the state is an index of the user equipment having a minimum data rate in a current time slot, the action corresponds to a power level of the corresponding user equipment in the cluster, and the quality function is a function providing a discount expected reward for a combination of each state and the action.

2. The transmission power allocation method based on user clustering and reinforcement learning of claim 1, wherein the clustering step includes a step of allocating n+(z−1)*k-th user equipment among the user equipments sorted in the size order of the channel gains to an n-th cluster, wherein n represents an index of the cluster, z represents an order of the corresponding user equipment in the n-th cluster, and k represents the number of clusters.

3. The transmission power allocation method based on user clustering and reinforcement learning of claim 2, wherein the clustering step includes a step of determining the number of user equipments included in each cluster based on a modular operation of the number of clusters to the number of all user equipments in the coverage.

4. The transmission power allocation method based on user clustering and reinforcement learning of claim 1, wherein the power allocation step further includes an initialization step of allocating any action with respect to each user equipment in the coverage before allocating the power to the user equipment.

5. The transmission power allocation method based on user clustering and reinforcement learning of claim 1, wherein the power allocation step includes a step of acquiring an optimal action corresponding to the action and state combination providing a maximum discount expected reward in the quality function.

6. The transmission power allocation method based on user clustering and reinforcement learning of claim 5, wherein the power allocation step includes a step of allocating a value obtained by multiplying a power budget per cluster in the acquired optimal action.

7. The transmission power allocation method based on user clustering and reinforcement learning of claim 1, wherein the power allocation step further includes a data rate acquisition step of acquiring a data rate of each user equipment in the cluster.

8. The transmission power allocation method based on user clustering and reinforcement learning of claim 7, wherein the power allocation step further includes a quality function update step of updating the quality function based on the data rate of each user equipment in the cluster.

9. The transmission power allocation method based on user clustering and reinforcement learning of claim 8, wherein the quality function update step includes a step of setting a sum data rate of user equipments located in the coverage as a reward when a minimum data rate is larger than a minimum data rate requirement in the cluster;

a step of setting 0 as the reward when the minimum data rate is smaller than or equal to the minimum data rate requirement in the cluster; and a step of updating the quality function using the set reward.

10. A NOMA system comprising:

a base station configured to perform the operations according to claim 1; and user equipments served by the base station.

* * * * *